July 14, 1925.
L. M. ROSENTHAL
1,545,604
RUBBER COAT AND METHOD OF MAKING SAME
Filed April 6, 1921
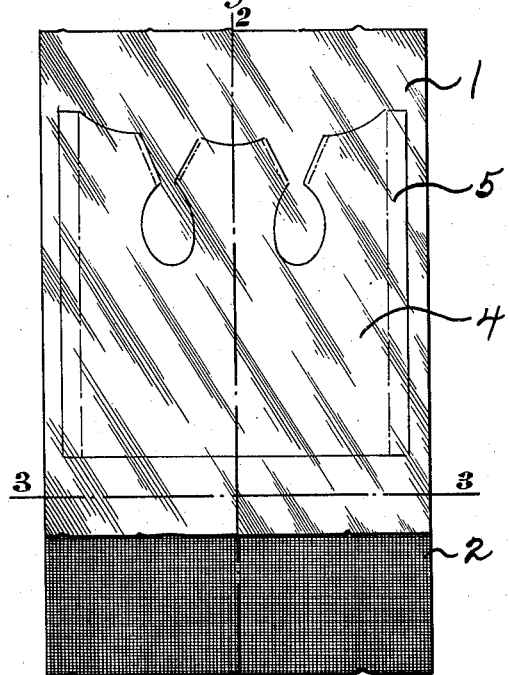
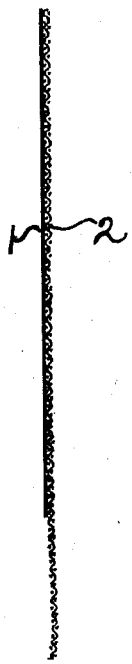
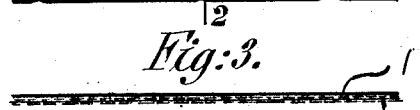
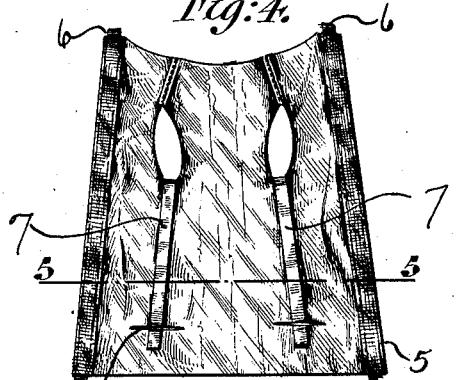
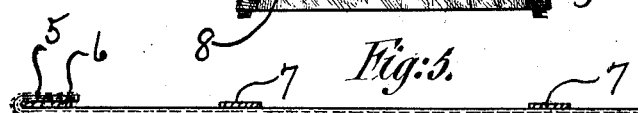
INVENTOR
Leon M Rosenthal
BY
ATTORNEYS.

Patented July 14, 1925.

1,545,604

UNITED STATES PATENT OFFICE.

LEVI M. ROSENTHAL, OF NEW YORK, N. Y.

RUBBER COAT AND METHOD OF MAKING SAME.

Application filed April 6, 1921. Serial No. 458,948.

*To all whom it may concern:*

Be it known that I, LEVI M. ROSENTHAL, a citizen of the United States, residing at 610 W. 152nd St., New York city, in the county of New York and State of New York, have invented certain new and useful Improvements in Rubber Coats and Methods of Making Same, of which the following is a specification.

My invention relates to a new and improved method of making rubber coats and the like, and an improved construction of such garments.

The so-called rubber coats have been hitherto manufactured of a composite fabric made of a sheet of textile material and a sheet of rubber pressed and vulcanized together. The sheet of textile fabric was first passed between calenders while the operator suitably applied the raw or unvulcanized rubber so that this unvulcanized rubber was spread upon the woven textile fabric in the form of a thin adherent sheet.

The composite fabric was then vulcanized. This was done by spreading it out in a vulcanizing chamber and heating it by means of steam, or by the so-called cold process in which the fabric was dipped into a bath of a suitable composition.

Up to the present time, the coats were cut out of a composite fabric so made, by making a pattern of the coat in several parts or pieces, these patterns being so placed that they were parallel to the warp threads of the woven fabric.

The pieces of the fabric so cut out were not stretchable in the direction of their lengths, because the warp threads of a woven fabric are not substantially stretchable.

The pieces of the coat so cut out are then fastened together by means of a rubber cement, and were vulcanized together. The completed rubber coat made by the old method therefore consisted of several sections having longitudinal cemented seams with the textile fabric substantially non-stretchable in the direction of its length and readily stretchable along the width thereof.

Coats made by this old method, which are sold in tremendous quantities, have been subject to many defects. It has been noticed for many years that if the person wearing a coat of this kind engaged in active manual labor while wearing it, as is usually the case, that the coat soon lost its waterproof properties at a number of spots so that it did not furnish really adequate protection.

It was thought that this was due to the fact that the rubber was not of proper composition, was not properly calendered, or was not properly vulcanized and great attention was paid to the various stages of the manufacture of the said coats, as above mentioned, so that it was necessary to employ highly skilled labor.

According to my invention, I have discovered that the defects of these rubber coats have arisen from the cutting and making thereof so that it is possible to manufacture a much superior garment at a saving of as high as thirty-three and a third per cent of the manufacturing price thereof.

If a person engaged in actual manual labor wore one of the coats as before constructed, and this was tightly buttoned around his body, then any bending or other movement of his body would tend to cause the coat to stretch along the width thereof. In a coat made according to the old method, the textile fabric was free to readily stretch along its width, because this was the direction in which the filler threads ran, and of course the thin sheets of vulcanized rubber could stretch much more easily than the textile fabric.

As a result of the unequal stretching of the textile fabric and the thin sheet of rubber when subjected to the same strain, the sheet of rubber tended to separate from the textile fabric and since the sheet of rubber was very thin, holes speedily developed at the points where it had lost its contact with the textile fabric, and that is why the coat became non-waterproof. Of course, high grade coats made of the finest quality of rubber lasted longer than cheaper coats, but the same defect occurred in all rubber coats made by the old method, in the course of time.

These coats also tended to separate at their seams, unless the vulcanization of the cement was very carefully completed and the parts of the coat had been very firmly pressed together when they were cemented, and before this cement was vulcanized.

One of the objects of my invention is to make a coat out of a sheet of composite fabric as before mentioned, with the filler threads parallel to the length of the coat. The fabric which forms a part of the said composite material is made of a woven cloth, which is relatively quite stretchable in the direction of the filler threads, and is substantially non-stretchable in the direction of the warp threads.

Another object of my invention is to provide non-stretchable members at certain designated parts of the coat.

Another object of my invention is to make the body of a coat of a single piece of fabric.

Other objects of my invention will be set forth in the following description and drawings which illustrate a preferred embodiment thereof.

Fig. 1 shows how a pattern is laid upon a sheet of composite fabric.

Fig. 2 is a cross-section along the line 2—2 of Fig. 1.

Fig. 3 is a cross-section along the line 3—3 of Fig. 1.

Fig. 4 shows the body of the coat and the reinforcing strips therefor.

Fig. 5 is a cross-section along the line 5—5 of Fig. 4 but on a larger scale.

The piece of composite fabric is made of a rubber sheet 1 and an ordinary woowen textile fabric 2.

As set forth diagrammatically in Figs. 1, 2 and 3, the pattern 4 which is preferably made of one piece, is placed upon the composite fabric so that the length of the pattern is preferably parallel to the filler threads, which are shot in between the warp threads by the shuttle or shuttles used in the loom.

Hence when the piece of composite fabric is cut out according to my invention to form the body of the coat, it is readily stretchable along the length thereof and it is substantially non-stretchable along the width thereof because the textile material forming part of the said composite fabric, as before mentioned, is stretchable in the direction of the filler threads, and is substantially non-stretchable in the direction of the warp threads.

The pattern is made of such width that it no only affords material for the body of the coat, but the parts 5 thereof shown in Fig. 1, which are extra or flap portions which may be folded over upon the body portion of the coat as illustrated in Figs. 4 and 5 for purposes later to be described.

In order to prevent the body of the coat from stretching at the ends thereof or at the sides thereof, non-stretchable strips 6 and 7 are applied at the end portions.

These non-stretchable strips 6 and 7 may be cut out of pieces of woven fabric, parallel to the warp threads thereof and they can be secured by cementing or stitching for example. In the embodiment shown in Figs. 4 and 5, the flaps 5 are bent over and the substantially non-stretchable strips 6 and 7 are cemented in position.

The substantially non-stretchable strips or members 7 may be of any desired length, as only one length thereof is shown in Fig. 4.

Experience has shown that a coat made according to the method before mentioned is substantially non-stretchable at the ends thereof where the buttons and buttonholes are located, so that the coat may be manipulated in the ordinary manner which would not be easy if these end portions were stretchable.

By providing the strips 7 adjacent the sleeves and pockets of the coat, the coat is prevented from sagging or stretching at the side pocket portions.

The slits 8 for the pockets are shown in Fig. 4 and the rest of the process of manufacture of said coats is not illustrated herein, because my invention does not extend thereto and the coat may be completed by providing the sleeves and buttons and the like in any well-known manner.

Since the body of the coat is substantially non-stretchable in the direction of its width, the textile fabric does not tend to separate from the rubber when the wearer of the coat bends or does any active manual work so that a coat made according to my invention is not only very much cheaper to produce but is of superior durability.

The lining of a coat made according to my invention is not illustrated as it is well known in the trade that goods of this kind have only a little lining around the shoulder parts thereof.

I have shown a preferred embodiment of my invention but it is clear that numerous additions and omissions could be made without departing from its spirit.

It is to be understood that the representation of the textile material shown in the drawings is not intended to designate any definite weave, because in the coat as made according to my method, the warp threads run along the width of the coat while the filler threads which are interlaced between the warp threads by the action of the shuttle run along the length of the garment.

Of course, the chief value of my invention is to prevent the rubber from being separated from the rest of the composite fabric along the shoulder portions of the garment because that is the place where the greatest and most frequent strains take place.

I claim:—

1. A rubber coat or the like made of a composite fabric consisting of a sheet of textile material and a sheet of rubber connected thereto, the said textile fabric being stretchable in the direction of the length of the coat or the like, and being substantially non-stretchable in the direction of the width of the said coat or the like.

2. A coat or the like made of a composite fabric consisting of a sheet of rubber connected to a sheet of less stretchable material stretchable along one line thereof and substantially non-stretchable along a line at right angles to the first-mentioned line, the said less stretchable material being so arranged in the coat that it is stretchable along the length of the coat and it is substantially non-stretchable along the width of the coat.

3. A coat or the like made of a composite fabric consisting of a sheet of rubber connected to a sheet of woven textile material, the said woven textile material being stretchable along the length thereof and being substantially non-stretchable along the width thereof, the said coat being provided with members substantially non-stretchable along their longitudinal dimensions and secured along the longitudinal ends of said coat.

4. A coat or the like made of a composite fabric consisting of a sheet of rubber connected to a sheet of woven textile material, the said woven textile material being stretchable along the length thereof and being substantially non-stretchable along the width thereof, the said coat being provided with members substantially non-stretchable along their longitudinal dimensions and secured along the longitudinal ends of said coat and secured also adjacent the pocket portions of said coat.

5. A coat or the like having its body portion made of a single sheet of composite fabric consisting of a single sheet of rubber secured to a single sheet of textile material, the said textile material being stretchable along the length of the coat and being substantially non-stretchable along the width thereof.

6. A coat or the like having its body portion made of a single sheet of composite fabric consisting of a single sheet of rubber secured to a single sheet of textile material, the said textile material being stretchable along the length of the coat and being substantially non-stretchable along the width thereof, the said coat having members substantially non-stretchable along their longitudinal dimensions and secured along the longitudinal edges of said coat and secured also at the sleeve portions of said coat.

7. A rubber coat or the like made of composite fabric which includes a sheet of rubber, the said composite fabric being substantially non-stretchable along the width thereof.

8. A rubber coat or the like made of a composite fabric including a sheet of rubber, the shoulder portions of the said coat being substantially non-stretchable along the width thereof.

In testimony whereof I hereunto affix my signature.

LEVI M. ROSENTHAL.